UNITED STATES PATENT OFFICE.

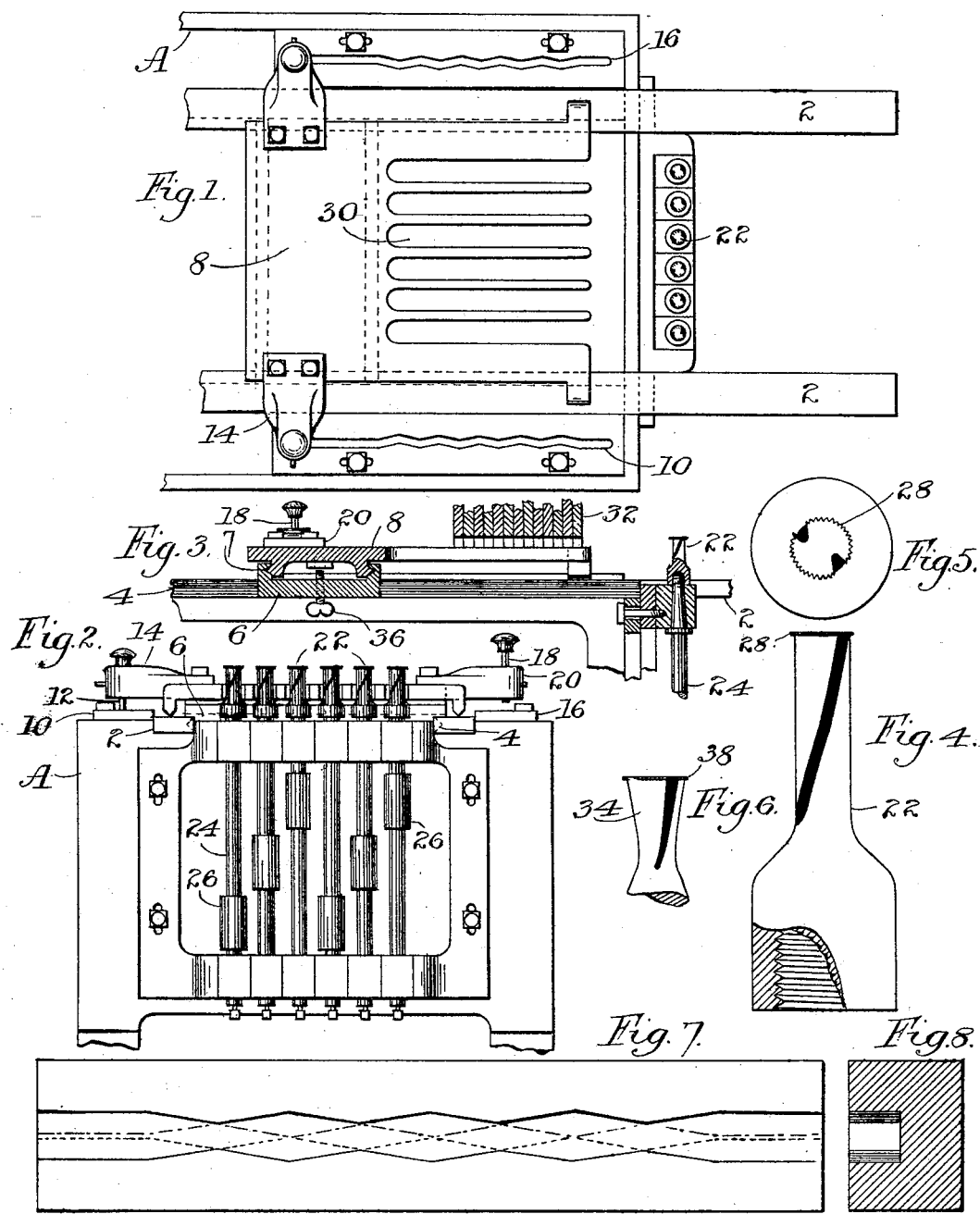

CHARLES CRISTADORO, OF ST. PAUL, MINNESOTA.

DOVETAILING-MACHINE.

SPECIFICATION forming part of Letters Patent No. 480,251, dated August 9, 1892.

Application filed January 16, 1892. Serial No. 418,274. (No model.)

*To all whom it may concern:*

Be it known that I, CHARLES CRISTADORO, of St. Paul, Ramsey county, Minnesota, have invented certain Improvements in Dovetailing-Machines, of which the following is a specification.

My invention relates to improvements in machines for cutting simultaneously a plurality of dovetail tenons or mortises, its object being to provide a machine which shall cut such tenons and mortises with plane faces or surfaces.

To this end my invention consists in arranging at the end of the bed of a machine a series of vertical spindles carrying cutters which for the making of mortises are straight or cylindrical cutters and for the making of tenons are in the form of inverted cones. Sliding freely upon the bed of the machine in a right line to and from the cutters is a suitable table or frame. Carried by this table is a secondary table or frame free to slide laterally upon the first at right angles to its path of movement. The secondary table is provided with a series of slots, in which the cutters pass as the table is advanced with the work. Arranged upon the bed of the machine at the sides of the secondary table are zigzag guides, with which are adapted to engage guide-pins carried by the table, the inner and outer angles of one guide being respectively exactly opposite the inner and outer angles of the other guide, so that with the guide-pin engaging one of said guides the upper or secondary table is given a zigzag movement corresponding with the angles of said guide, while with the other guide-pin engaging the other guide the table is given an exactly opposite lateral movement at corresponding points in its forward and backward movement. The distance between the angles of the guides is preferably exactly equal to the thickness of two of the boards required to be mortised. These boards are placed on end upon the table transversely thereof and firmly clamped in place. The diameter of the cutters is exactly the width of the narrow side of the mortise, one of the guide-pins being dropped into its guide while the other is raised out of engagement with its guide. As the tables are advanced the stock is carried forward with a zigzag movement, the cutters passing through two boards at one angle, the two next at the reverse angle, and so on. On the return movement the first guide-pin is released from its guide and the second dropped into engagement with its guide. The table then being removed backward, the guide is carried backward with the opposite zigzag movement and the cutters travel through the stock along lines intersecting their first path, thus cutting out dovetailed openings or mortises in the boards. In the cutting of tenons the tables are fixed rigidly together, the guide-pins thrown out of engagement with the guides, conical cutters are substituted for the straight or cylindrical cutters, and with the movement of the carriage or table the cutters travel directly through the stock, cutting out dovetailed sections in the ends of the boards, leaving intermediate corresponding dovetailed tenons, the sizes of the two sets of cutters being such that the tenons formed by one will exactly fit the mortises formed by the other.

My invention further consists in the construction and combination hereinafter described, and particularly pointed out in the claims.

In the accompanying drawings, forming part of this specification, Figure 1 is a plan view of a portion of my improved machine, showing the ends of the cutters, the carrying-table, the guides, and guide-pins. Fig. 2 is an end elevation of the same, showing the arrangement of the cutters. Fig. 3 is a longitudinal vertical section through one of the cutters and the slot in the table in which it works, showing the arrangement of the two tables and the manner in which the cutters are carried through the stock. Fig. 4 is a detail side elevation of one of the straight or cylindrical cutters. Fig. 5 is an end view of the same. Fig. 6 is a side elevation of one of the conical cutters. Fig. 7 is a plan view of a modified form of zigzag guide, being practically a combination of the two guides shown in Fig. 1; and Fig. 8 is a cross-section of the same.

In the drawings, A represents the frame or bed of the machine, the rails 2 being preferably extended beyond the end of the machine, as shown in Fig. 1. These rails are provided, preferably, with grooves 4, in which slides freely the table 6. This table is similarly grooved at right angles with the grooves 4 to receive the dovetailed projections 7 on the under side of the secondary table 8, which is thereby secured upon the table 6. The table 8 therefore has two movements, one forward and back on the machine as carried by the table 6 and another at right angles therewith sliding upon the table 6. Arranged on one side the table 8 is a zigzag grooved guide 10, into which is adapted to fit a guide-pin 12, carried by the arm 14, secured to the table 8, while on the opposite side of the table is a similar but oppositely-angled guide 16, into which the pin 18, carried by the arm 20, fits. These guides respectively control the lateral movement of the table 8. At the forward end of the machine is arranged a series of cutters 22, carried by vertical spindles 24, which are adapted to be driven by any suitable means, as by belts running upon their drums 26 and connecting them to a source of power. These cutters, as shown in Figs. 2, 3, 4, and 5, are straight or cylindrical, provided at the end or top, preferably, with saw-teeth 28 to cut the corners of the mortise. The table 8 is provided with the series of slots 30 to receive the cutters as the table is moved past them. The boards or stock 32 to be mortised are clamped on end transversely of the table above the grooves 30, as shown best in Fig. 3, the ends of the cutters 22 projecting above the top of the table 8 a distance equal to the thickness of one of the boards of the stock. Consequently with the movement of the table forward the cutters are carried through the stock held thereon. The path of the cutters is determined by the guide 10 or 16, with which the guide-pin is in engagement as the case may be, this guide-pin then being disengaged from its guide and the other guide-pin dropped into its guide. With the return movement of the main table the secondary table and its stock are carried through a zigzag course exactly opposite to the first, whereby the cutters follow paths intersecting their first paths and cut out dovetail sections through the edges of the boards. In the cutting of tenons the conical cutters 34 (shown in Fig. 6) are substituted for the cutters 22, both the guide-pins 12 and 18 being disengaged from their guides and the tables firmly secured together by means of a clamp or set-screw 36. The boards and stock, being placed in the same position, as before described, upon the table 8, are carried in a right line over the cutters, which cut a dovetail path through them, the saw-teeth 38 upon the ends of the cutters cutting the shoulders of the tenons. This conical cutter, however, forms no part of my present invention, it being shown and its work described for the purpose of indicating that the machine by proper adjustment is adapted to do all of the work of tenon and mortise cutting, my invention being confined to the improvements by which the mortises are cut.

With the modified form of guide shown in Figs. 7 and 8 but one guide-pin is used, the pin being held firmly against one side of the groove with the forward movement of the table and against the opposite side of the groove with the return or backward movement of the table, the paths of the cutters through the stock being the same as when the guides shown in Fig. 1 are used, the path of the guide-pin in one direction being indicated by the dotted line and in the other direction by the dot-and-dash line in Fig. 7, the cutters following exactly similar courses in their work.

I claim—

1. In a dovetailing-machine, the combination, with the series of cutters, of the table arranged at right angles with the plane of the cutters and slidable to and from them, the secondary table carried by it and slidable laterally thereon, and the regular angular zigzag guides for said second table, whereby said table is reciprocated upon the machine in exactly similar but oppositely-angled zigzag courses, substantially as described.

2. In a dovetailing-machine, the combination, with the series of cutters, of a table or carriage arranged in a plane at right angles to the plane of said cutters and adapted to be carried to and fro over the same, and automatic means for moving it laterally during its travel, so as to cause it to describe regular angular zigzag courses, the angles of one course being exactly the opposite of the angles of the other, substantially as described.

3. In a device of the class described, the combination, with the cutters, of the table or carriage slidable over the same, means for guiding said table in a regular angular zigzag course while traveling in one direction and in a similar but exactly oppositely-angled course while traveling in the opposite direction, substantially as described.

4. In a dovetailing-machine, the combination, with the series of cutters, of the main table slidable to and from said cutters, the secondary table carried thereby and slidable thereon at right angles to the path of its movement, oppositely-arranged angular zigzag guides for said secondary table, and means alternately connecting the same with said guides, whereby when reciprocated over the cutters the cutters are carried through the stock in intersecting zigzag paths, substantially as described.

5. The combination, with the cutters, of the table slidable in a right line to and from said cutters, the secondary table carried thereby and slidable thereon at right angles with its path of movement, the guides having regular reverse angled grooves oppositely arranged, and the guide-pins carried by said secondary table and adapted to be alternately engaged with their respective guides, substantially as described.

In testimony whereof I have hereunto set my hand this 11th day of January, 1892.

CHARLES CRISTÁDORO.

In presence of—
T. D. MERWIN,
A. M. WELCH.